United States Patent
Chen et al.

(10) Patent No.: US 11,792,278 B2
(45) Date of Patent: Oct. 17, 2023

(54) RESOLVING CONFLICTS OF APPLICATION RUNTIME DEPENDENCIES

(71) Applicant: VMware, Inc., Palo Alto, CA (US)

(72) Inventors: Zhikai Chen, Beijing (CN); Zhibin He, Beijing (CN); Tracy Yan Chi, Beijing (CN); Stephen Yu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 78 days.

(21) Appl. No.: 15/281,684

(22) Filed: Sep. 30, 2016

(65) Prior Publication Data

US 2018/0097869 A1 Apr. 5, 2018

(51) Int. Cl.
  *H04L 67/00* (2022.01)
  *G06F 9/455* (2018.01)
  *G06F 16/176* (2019.01)
  *G06F 9/445* (2018.01)

(52) U.S. Cl.
  CPC .......... *H04L 67/34* (2013.01); *G06F 9/45558* (2013.01); *G06F 16/176* (2019.01); *G06F 9/44505* (2013.01); *G06F 9/44521* (2013.01); *G06F 2009/45579* (2013.01)

(58) Field of Classification Search
  CPC ............... G06F 16/176; G06F 9/45558; G06F 9/44505; G06F 9/44521; G06F 2009/45579; H04L 67/34
  See application file for complete search history.

(56) References Cited

U.S. PATENT DOCUMENTS

| | | | | |
|---|---|---|---|---|
| 6,886,019 | B1* | 4/2005 | Cannon | G06F 3/0659 |
| 7,389,313 | B1* | 6/2008 | Hsieh | G06F 11/2071 |
| 8,793,379 | B2* | 7/2014 | Upadhya | G06F 3/0632 717/174 |
| 8,886,995 | B1* | 11/2014 | Pallapothu | G06F 11/1405 714/15 |
| 9,201,887 | B1* | 12/2015 | Earl | G06F 9/45533 |
| 9,892,265 | B1* | 2/2018 | Tripathy | G06F 21/602 |
| 2009/0282231 | A1* | 11/2009 | Nomoto | G06F 16/10 713/1 |
| 2010/0070965 | A1* | 3/2010 | Britten | G06F 8/65 717/173 |
| 2012/0222028 | A1* | 8/2012 | Nakajima | H04L 61/5038 718/1 |

(Continued)

*Primary Examiner* — Dhairya A Patel (57) ABSTRACT

Described herein are systems, methods, and software to handle requests to an application file shared by a plurality of applications on a computing system. In one implementation, a method of handling request for an application file shared by a plurality of applications on a computing system includes identifying a request for the application file on the computing system, wherein each application in the plurality of applications is associated with an individualized version of the application file, and wherein the plurality of applications is stored on separate application storage volumes attached to the computing system. The method further provides identifying an application associated with the request, and identifying an application storage volume in the application storage volumes that stores the application. Once identified, the method also includes retrieving the application file from the identified storage volume to support the request.

20 Claims, 7 Drawing Sheets

(56) References Cited

U.S. PATENT DOCUMENTS

| | | | | |
|---|---|---|---|---|
| 2013/0111034 A1* | 5/2013 | Upadhya | ............... | G06F 3/0605 |
| | | | | 709/226 |
| 2013/0238564 A1* | 9/2013 | Tucker | ................ | G06F 11/2097 |
| | | | | 707/656 |
| 2014/0032638 A1* | 1/2014 | Park | ...................... | H04L 67/125 |
| | | | | 709/203 |
| 2014/0149361 A1* | 5/2014 | Hosey | ................. | G06F 16/2365 |
| | | | | 707/690 |
| 2014/0372553 A1* | 12/2014 | Blackburn | .............. | H04L 67/34 |
| | | | | 709/217 |
| 2015/0074536 A1* | 3/2015 | Varadharajan | ...... | G06F 3/04842 |
| | | | | 715/734 |
| 2015/0112939 A1* | 4/2015 | Cantwell | ................. | G06F 16/14 |
| | | | | 707/646 |
| 2017/0102852 A1* | 4/2017 | Agrawal | ............. | G06F 3/04817 |
| 2019/0312935 A1* | 10/2019 | Selvarajan | .............. | H04L 67/12 |

\* cited by examiner

RESOLVING CONFLICTS OF APPLICATION RUNTIME DEPENDENCIES

TECHNICAL BACKGROUND

In virtual computing environments, host computers may execute a plurality of virtual machines that can be accessed as a service by end users. These users may login to the service via end user devices and, in response to the login, be provided with a virtual machine to accomplish desired tasks. Once the user logs out of the service or the virtual machine, the service may allocate the same virtual machine to a new requesting user.

Although this service model allows multiple users to access virtual machines and the applications available thereon, each of the users may require a different set of applications and other user data. For example, an engineer of an organization may require a different set of applications than a financial officer of the same organization. To remedy this issue, application storage volumes may be attached to a virtual machine to provide a virtual session for a requesting end user. To attach an application storage volume, a volume may be mounted to the virtual machine allocated for the end user, and registry information may be updated to make the application executable from the mounted application storage volume. Once application storage volumes are attached, the user may execute the applications located in the attached volumes as if the applications were locally installed on the virtual machine. Additionally, in some implementations, physical computing systems may apply similar attach mechanisms as the virtual machines to provide desired applications to users of the physical systems.

However, because multiple applications stored on multiple application volumes may be attached to a virtual machine or physical computing system, the applications may use different versions of shared libraries. For example, a first application on first storage volume may require a first version of a shared library, while a second application on a second storage volume may require a second version of the shared library. As a result, difficulties arise to ensure that the appropriate version of the shared library is used for each application when the applications are executed on the virtual or physical computing system.

Overview

The technology disclosed herein enhances how shared files are handled on a computing system with a plurality of attached application storage volumes. In one implementation, a method of handling requests for an application file shared by a plurality of applications on a computing system includes identifying a request for the application file on the computing system, wherein each application in the plurality of applications is associated with an individualized version of the application file, and wherein the plurality of applications is stored on separate application storage volumes attached to the computing system. The method further provides identifying an application associated with the request, and identifying an application storage volume in the application storage volumes that stores the application. Once identified, the method also includes retrieving the application file from the identified storage volume to support the request.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The various examples disclosed herein provide enhancements for managing conflicts in shared files for applications across attached storage volumes. In many implementations, computing systems, both real and virtual, may require applications to provide specific operations on the computing system. These operations may include productivity operations, such as word processing applications or spreadsheet applications, image and video editing operations, data processing operations, or any other similar operation. To provide these required applications to computing systems, applications storage volumes may be used that can be attached to the computing system to provide desired operations. These application storage volumes may include, virtual machine disks (VMDKs), virtual hard disks (VHDs), or some other virtual disk file capable of storing applications for execution on the computing systems.

To attach the application volumes to a particular computing system, a process may be initiated to mount the volumes to the appropriate computing system, and overlay the contents of the volumes to make the one or more applications within the volumes executable by the computing system. In some examples, mounting a volume to the computing system may include providing an access path and mount point for the volume to the computing system, which may comprise an internet protocol (IP) address, a directory name, a file name, or any other path information to access the contents of the particular volume. Once mounted, the contents of the volume may be overlaid within the computing system to make the application executable. This overlaying may include modifying registry keys or adding registry files to make the application executable from the attached volume, as well as modifying the file system view to make the application appear as though it has been locally installed. For example, when an application storage volume is attached to a computing system, the files and directories for the application may appear in the "C:\Program Files" directory, although the executable file components remain stored in the attached volume.

In some implementations, administrators may manage and perform installation processes to store the applications in the application storage volumes. These installation processes may extract the necessary files and registry keys from an installer, and store the files and registry key files to an appropriate application storage volume. In some examples, the administrator may define application stacks, or groups of applications that are commonly assigned, and provide these groups of applications in one or more application storage volumes. For example, a first application stack may include productivity applications to be supplied to a first set of end users, and a second application stack may include video and image editing software to be provided to a second set of end users. Once the applications are stored within the application volumes, the administrator may define which of the applications or volumes are associated with a user or system that requests access to the storage volumes.

Here, because various application storage volumes may be attached to a single computing system, conflicts may exist in the files that are required for a first application on a first storage volume and files that are required for a second application on a second storage volume. For example, the first application and the second application may require different versions of a shared dynamic link library (DLL) file. To overcome the conflict, a driver or some other software element associated with the computing system may be provided that identifies a request for a conflicting file that belongs to the two applications, identifies which of the applications is being invoked by the request, identifies an application storage volume associated with the request, and retrieves that associated file version from the identified volume. In some implementations, in overlaying the files within the computing system, the user may only identify a single shared file within the appropriate shared directory. However, when the file is request, the appropriate version of the file may be retrieved for processing of the desired application.

In some implementations, when the application storage volumes are used in conjunction with virtual machines, a virtual computing service may be employed that acts as a broker between the end users and the plurality of virtual machines, and further acts as a volume manager that initiates the attachment of application storage volumes to the individual virtual machines. For example, a user may, via an end user device, initiate a service login to initiate a virtual computing session. This service login may be accomplished using a dedicated application on the end user device, a web browser interface on the end user device, or any other similar interface on the end user device. Responsive to the service login, the virtual computing service may identify an available virtual machine to allocate to the end user, and initiate a user login process to log the end user into the virtual machine. Additionally, the service and/or the virtual machine itself may identify one or more storage volumes associated with the user and attach the one or more storage volumes to virtual machine. Once attached and the user is logged into the virtual machine, the user may execute any of the applications from the attached storage volumes.

Figure 1:
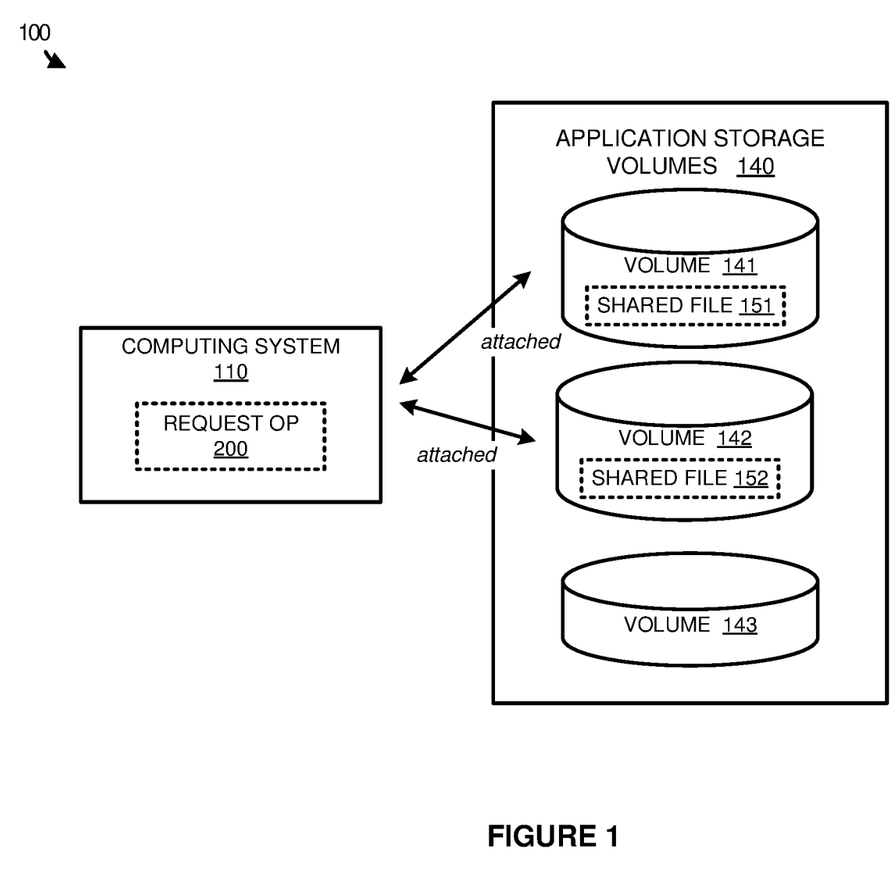
FIG. 1 illustrates a computing environment to manage conflicts in shared files for multiple applications according to one implementation.

Referring now to FIG. 1, FIG. 1 illustrates a computing environment 100 to manage conflicts in shared files for multiple applications according to one implementation. Computing environment 100 includes computing system 110 and application storage volumes 140. Application storage volumes 140 includes volumes 141-143, which are capable of storing application files, such as executable, library, and registry files, for use with one or more computing systems. Application storage volumes 140 may be communicatively coupled to computing systems 110 using Ethernet, Internet, or some other similar communication interface. In some implementations, applications storage volumes 140 may reside, at least partially on the same physical computing system as computing systems 110. For example, if computing system 110 were representative of a virtual machine, then application storage volumes 140 may reside on the same physical host.

In operation, computing system 110 may attach application storage volumes to provide operations on computing system 110. To attach the volumes a user and/or the device itself may be allocated specific applications, and may attach application storage volumes associated with the particular application. Here, computing system 110 is associated with application storage volumes 141-142, and attaches the volumes to make applications stored on the volumes executable by a processing system for computing system 110. To attach the volumes, the volumes may be mounted to computing system 110 and contents of the volumes may be overlaid on computing system 110 to make the one or more applications stored on the volumes executable by the computing system. In some examples, mounting a volume to the computing system may include providing an access path and mount point for the volume to the computing system, which may comprise an internet protocol (IP) address, a directory name, a file name, or any other path information to access the contents of the particular volume. Once mounted, the contents of the volume may be overlaid within the computing system to make the application executable. This overlaying may include modifying registry keys to make the application executable from the attached volume, as well as modifying the file system view to make the application appear as though it has been locally installed. For example, when an application storage volume is attached to a computing system, the files and directories for the application may appear in the "C:\Program Files" directory, although the executable file and library components remain stored in the attached volume.

In the present example, application storage volumes 141-142 that are attached to computing system 110 include shared files 151-152, which correspond to different versions of a shared file for different applications. For example, the contents of volume 141 may correspond to resources (application files, registry files, etc.) associated with a first application, whereas the contents of volume 142 may include resources associated with a second application. Consequently, each of the applications may rely on a shared file, such as a database or a registry file, however, for various different reasons, each of the applications may require a different version of the shared file. Thus, request operation 200 is provided on computing system 110 to determine which of the applications is requesting a version of the shared file, and retrieves the appropriate version of the shared file to support the request. This permits applications, which may each require different versions of a shared file to retrieve the required file, while making the file system view and the registry key store of the operating system on computing system 110 appear as though a single shared file is present on the system. This may permit applications associated with different distribution versions to be attached to the same computing system without encountering a conflict of a new shared file version preventing execution of an older application.

In some implementations, a single version of the shared file may be viewable within the file system of computing system 110. To provide this operation, when volumes 141-142 are attached, a driver or some other software module may ensure that no shared files are overwritten by another attached storage volume. Instead, the driver may identify that different versions of a shared file are required by different applications, and route requests to the different versions of the shared file based on the application process making the request. Accordingly, when a request is made to the shared file within the file system (which may be made in the same manner by all of the applications that require file), the driver or some other software element may be used to determine the application associated with making the request, and identify a storage volume associated with the identified application. Once identified, the appropriate version of the shared file may be retrieved from one of volume 141 or 142 to support the request.

Figure 2:
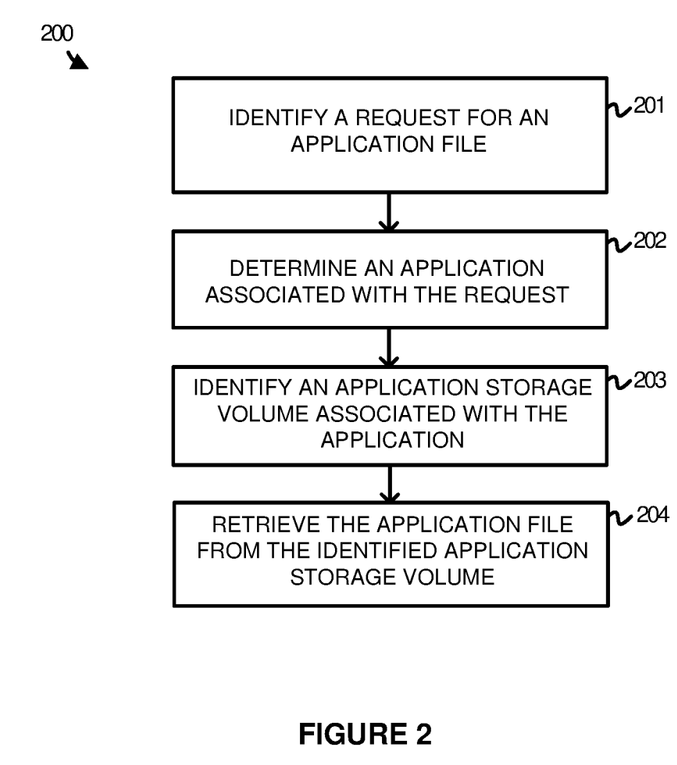
FIG. 2 illustrates a request operation to manage conflicts in shared files for multiple applications according to one implementation.

To further demonstrate request operation 200, FIG. 2 is provided. FIG. 2 illustrates a request operation 200 to manage conflicts in shared files for multiple applications according to one implementation. The operations in FIG. 2 are referenced parenthetically in the paragraphs that follow with reference to systems and objects of computing environment 100 of FIG. 1.

As described in FIG. 1, computing system 110 has attached application storage volumes 141-142 to support required operations on computing system 110. Within each of the storage volumes includes resources for applications, including executable files, DLLs, registry files, and any other similar resource for executing an application one the volume is attached to the computing system. In the present implementation, a first application stored on application storage volume 141 requires a first version of a shared file 151, and a second application on application storage volume 142 requires a second version of a shared file 152. As a result, because the applications are not installed on the computing system it may be required to resolve a conflict when each requires their associated version of the shared file.

In at least one implementation, within a user view (file system or key registry view), the user may only be able to view one version of the shared file although both applications may use their corresponding file version. Referring to operation 200, operation 200 identifies (201) a request for an application file, wherein the application file may include multiple versions used by different applications provided in the attached application storage volumes. In response to identifying the request, which may occur when the application is initially executed or during the operation of the application, operation 200 determines (202) an application associated with the request, and identifies (203) an application storage volume associated with the application. Once the application storage volume is identified, the operation retrieves (204) the application file from the identified application storage volume.

Referring to FIG. 1, a request may be identified from a user of computing system 100 to initiate a first application. In response to the request, files for the application may be identified that are required for the execution of the application, including the appropriate shared file in shared files 151-152. For example, if the request were for an application stored on application volume 141, then shared file 151 would be retrieved to accommodate the application request.

In some implementations, in identifying the appropriate application for a request, request operation may identify the source of the request, such as the file storage location of the file making the request, the name of the requesting executable file, or any other similar information.

In some examples, when volumes 141-142 are mounted to computing system 110 and the contents are overlaid on computing system 110, only one instance of a shared file may be viewable within the file system view or registry view for the user of computing system 110. This permits a single instance of a shared file to be viewable in a user viewable location on the computing system, although when executed, multiple versions of the file may be retrieved from the attached storage volumes based on the requesting application. In some implementations, the driver or other software element implementing request operation 200 may also maintain records or other metadata information to determine which of the shared files have multiple versions for the individual applications. Thus, as applications are attached, information is maintained to ensure each application receives a required version of a shared file. This permits each application to request the shared file in the same manner and using the same name, but be redirected by the driver to their individual version of the shared file.

Figure 3:
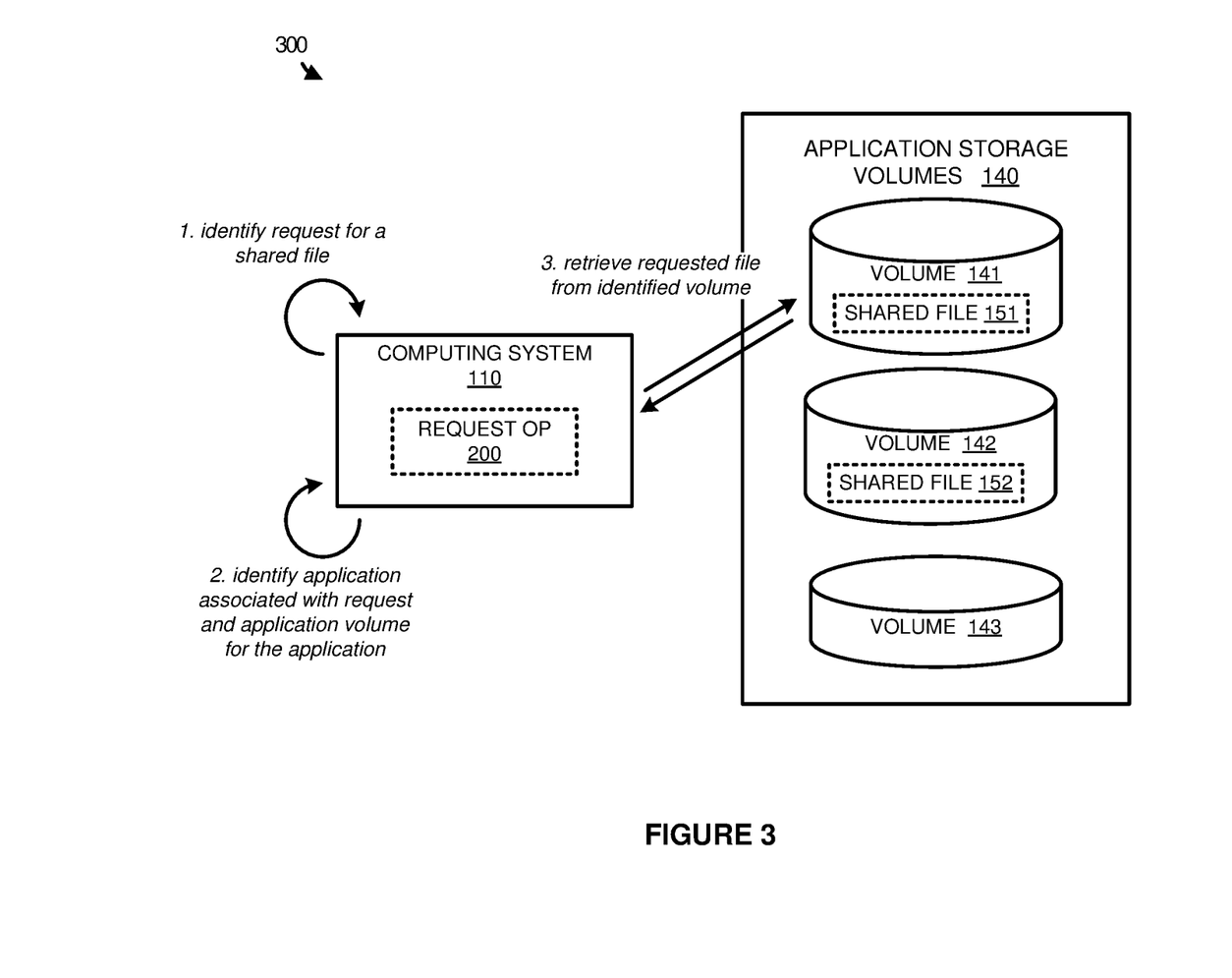
FIG. 3 illustrates an operational scenario of managing conflicts in shared files for multiple applications according to one implementation.

FIG. 3 illustrates an operational scenario 300 of managing conflicts in shared files for multiple applications according to one implementation. Operational scenario 300 is demonstrated with reference to elements and systems of computing environment 100 of FIG. 1.

As depicted, at step 1, computing system 110 identifies a request for a shared file, wherein the shared file may comprise a library file, such as a DLL, a registry file, or some other file that can be shared between multiple applications. For example, shared files 151-152 may represent multiple versions of a shared file that are each used with applications that reside on corresponding application storage volumes 141-142. In response to the request, computing system 110, at step 2, identifies an application associated with the request and an application storage volume for the application. Once identified, in this example as corresponding to application storage volume 141, shared file 151 may be retrieved for processing by computing system 110.

For example, if shared file 151 corresponded to a first version of a shared library file for a text editing application, and shared file 152 corresponded to a second version of the shared library file for spreadsheet application, shared file 151 would be used when a request is generated for the text editing application. Thus, if a user of computing system 110 requested an operation associated with the text editing application, computing system 110 may identify the source of the request and associate the source with the appropriate application. Once the source application is identified with the associated application storage volume, the file may be retrieved from the application storage volume for the application.

In some implementations, in generating each of the application volumes, an administrator of the application storage volumes may manage and perform installation processes to store the applications in the application storage volumes. These installation processes may extract the necessary files and registry information from an installer, and store the files and registry information to an appropriate application storage volume. In particular, the installation processes may ensure that files, including those that are often shared with other applications, are available on the appropriate storage volume. Thus, the application can execute without relying on a second application to provide the required shared library files and/or registry key files.

In some examples, the administrator may define application stacks, or groups of applications that are commonly assigned, and provide these groups of applications in one or more application storage volumes. For example, a first application stack may include productivity applications to be supplied to a first set of end users, and a second application stack may include video and image editing software to be provided to a second set of end users. Once the applications are stored within the application volumes, the administrator may define which of the applications or volumes are associated with a user or device that requests access to the service.

Figure 4:
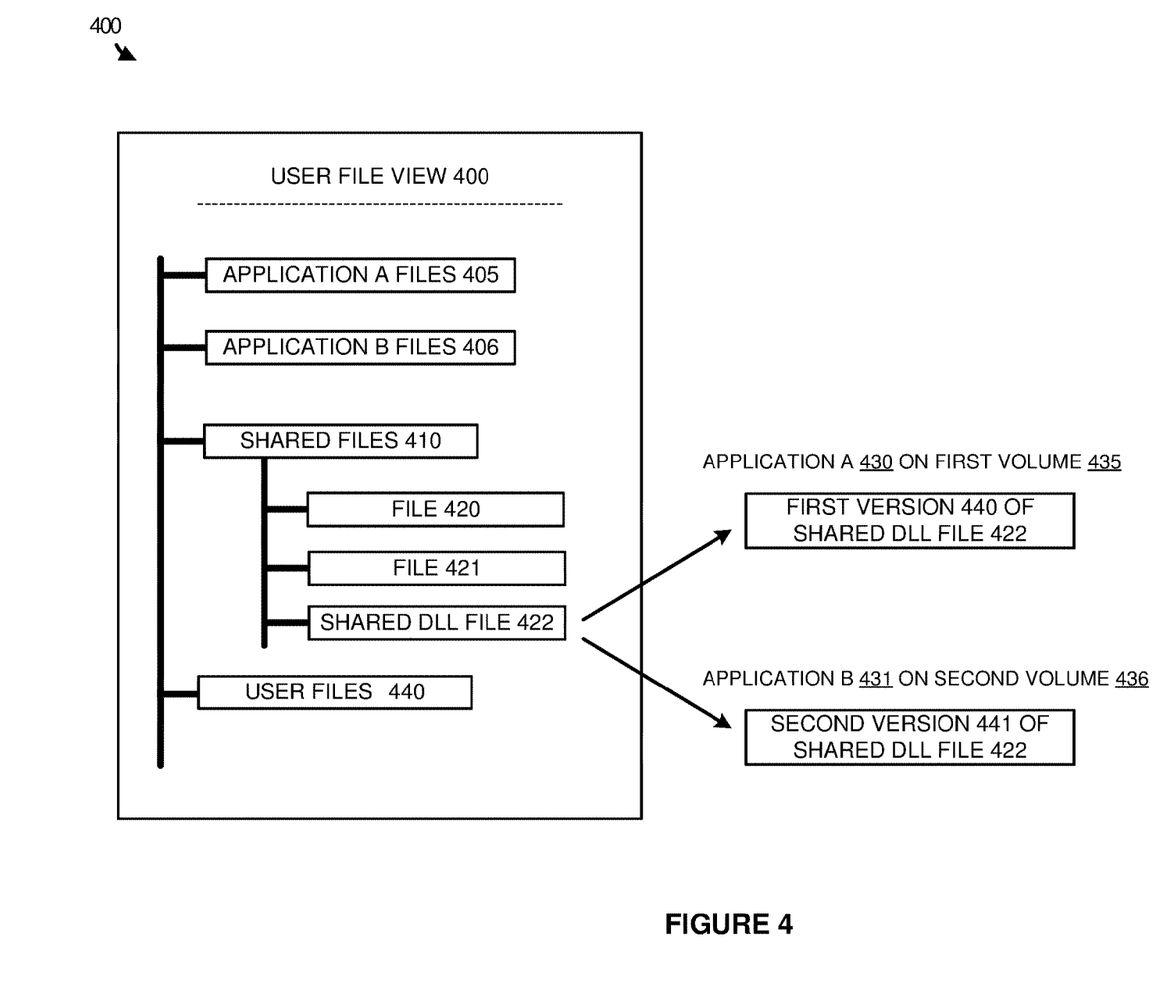
FIG. 4 illustrates an overview of managing conflicts in shared files for multiple applications according to one implementation.

FIG. 4 illustrates an overview 400 of managing conflicts in shared files for multiple applications according to one implementation. Overview 400 includes user file view 400, application A files 405, application B files 406, shared files 410, and user files 440. Shared files 410 further includes files 420-421 and shared DLL file 422. Shared DLL file 422 in representative of a pointer to either first version 440 of shared DLL file 422 or second version 441 of shared DLL file 422, which will depend on the application making the request.

In particular, as described herein, multiple application storage volumes may be attached to a computing system to provide various operations on the computing system. To ensure that each of the applications does not have dependencies on another application volume or application to be attached to the computing system, each of the application volumes may maintain their own version of shared files. As a result, although multiple application volumes may be attached to the same computing system, each of the applications may maintain their version of a shared file, which is independent from other applications that may also be attached to the same computing system.

In at least one implementation, when the volumes are attached, which may include mounting the volumes and overlaying the files within the volumes, only a single version of the shared file may appear visible within the user space for the computing system. This permits different applications, which may use different versions of the same shared file, to access their required version of the shared file. For example, a first application volume may be attached to a computing system, wherein the first volume may store a first application from a first version of a software suite. Additionally, a second application may be attached to the computing system, wherein the second volume may store a second application from a second version of a software suite. Because the first application and the second application come from different versions of a software suite, a shared database may be a conflict, as it may have been updated between distributing versions of the software suite.

Referring to the example of FIG. 4, two applications are attached via application volumes to a computing system, wherein the applications share shared DLL file 422. Here, in user file view 400, the user may only be able to view a single shared DLL file, however, when each of application A 430 or application B 431 are executed, different versions of the file may also be retrieved for processing by the computing system. In particular, if a request is associated with application A 430 then first version 440 may be retrieved for processing by the computing system. In contrast, if a request is associated with application B 431, then second version 441 may be retrieved for processing by the computing system.

In at least one implementation, in making the determination of the application associated with the request, a driver may be used capable of identifying the source of a particular request. This driver may be responsible for identifying files that are shared between the applications, identifying the source of the request using file identifiers, path identifiers, and the like for the source of the request, and providing the appropriate file for processing by the computing system. In some examples, the driver may further be configured to present a single version of the library within the user space of the computing system, while mapping the single file to different versions of that file. For example, when volumes 435 and 436 are attached to the computing system, rather than overwriting the shared file from one volume with the shared file for another volume, the drive may identify that each require an individual version of the file. Consequently, although a single shared DLL file 422 may be viewable within user file view 400 when the volumes are attached, the driver may maintain a record and redirect requests of shared DLL file 422 to one of first version 440 or second version 441 depending on the application making the requests. This permits each application to request the shared file in the same manner and using the same name, such as "C:\SHARED FILES\SHARED DLL FILE", but be redirected by the driver to their individual version of the shared file.

Although illustrated in the example of FIG. 4 as overlaying shared DLL files, it should be understood that other shared files may use similar operations. For example, a registry file may be associated with different versions for different applications. Accordingly, when a call is made to the registry, the appropriate file may be retrieved from the corresponding application volume.

Figure 5:
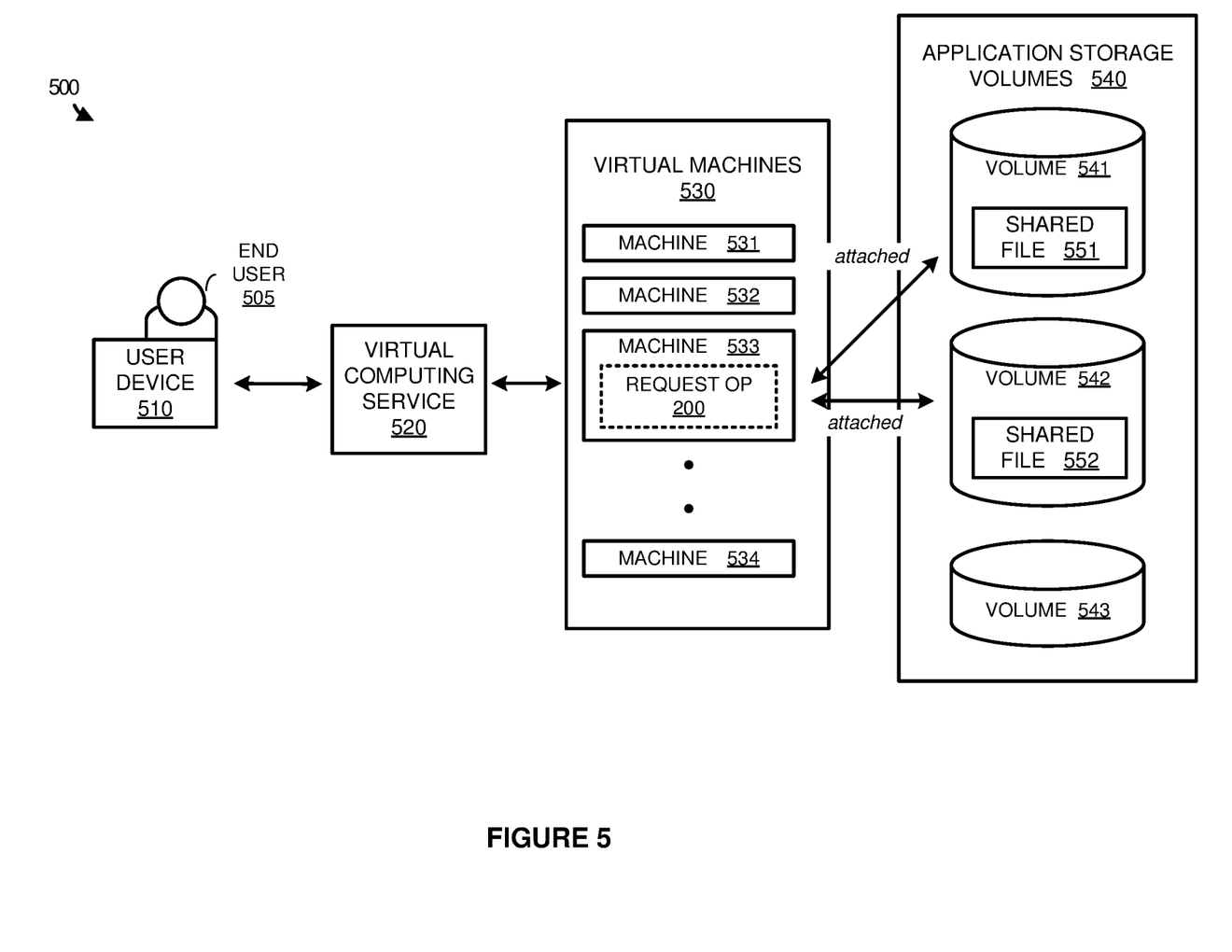
FIG. 5 illustrates a virtual computing environment to manage conflicts in shared files for multiple applications according to one implementation.

FIG. 5 illustrates a virtual computing environment 500 to manage conflicts in shared files for multiple applications according to one implementation. Virtual computing environment 500 is representative of an example of attaching application storage volumes to virtual machines associated with a virtual computing service. Virtual computing environment 510 includes user device 510 with end user 505, virtual computing service 520, virtual machines 530 with virtual machines 531-534, and application storage volumes 540 with volumes 541-543. Volumes 541-543 are representative of storage volumes where an administrator or some other management source may install applications for attachment to one or more virtual machines. Such volumes may include VHDs, VMDKs, physical disks, partitions, or some other storage volume capable of being mounted to a virtual machine.

In operation end user 505, using user device 510, will log into virtual computing service 520, wherein virtual computing service acts as a broker between end users and a plurality of virtual machines, and can further acts as a volume manager capable of initiating attachment of application storage volumes 540. This service login may be accomplished using a dedicated application on user device 510 to access the virtual machines from virtual computing service 520, may comprise a web interface on user device 510, or may comprise any similar interface on the user device. The service login may include providing a username, password, passcode, or some other similar credentials to permit end user 505 to access the virtual computing resources. In response to the login, virtual computing service 520 will identify a virtual machine in virtual machines 520 to be allocated to the end user and initiate a login process to provide access to the allocated virtual machine to end user 505. In some implementations, the allocation of the machine may include allocating an idle virtual machine in virtual machines 530, however, it should be understood that a virtual machine may be powered on or returned from a sleep state.

In addition to providing the user with the virtual machine, one or more application storage volumes from application storage volumes 540 may be attached to the allocated virtual machine to provide various operations to the end user. These volumes may be attached based on credentials associated with end user 505, such as credentials supplied when logging in to virtual computing service 520, and may be attached by virtual computing service 520, virtual machine 533, a hypervisor for virtual machine 533, or some other process executing in environment 500, including combinations thereof. For example, when user device 510 logs into virtual computing service 520, virtual computing service may allocate a virtual machine to user device 510 and, once the virtual machine is running, initiate a request to attach volumes associated with end user 505.

Here, volumes 541-542 are attached to machine 533, which has been allocated to provide the virtual session to end user 505. These volumes may be mounted to the virtual volume, and resources, such as program files, library files, and registry files may be overlaid within virtual machine 533 to make the application appear in the registry and file system as though it were locally installed on the virtual machine. In some examples, mounting a volume to the computing system may include providing an access path and mount point for the volume to the computing system, which may comprise an IP address, a directory name, a file name, or any other path information to access the contents of the particular volume. Once mounted, files and directories may be overlaid such that they appear within the file system and registry as though the application were locally installed, although the files will be executed from the attached volume.

In some implementations, such as that illustrated in virtual computing environment 500, application volumes may be attached wherein applications on the volumes may rely on different versions of the same shared file 551-552. These files may comprise registry files versions, DLL files, or some other similar shared file. Accordingly, because each of the applications relies on different versions, request operation 200 must be executed on virtual machine 533 to access the appropriate shared file version for a request. In particular, as described earlier in request operation 200 of FIG. 2, request operation 200 identifies a request for a shared application file, identifies an application associated with the request, and identifies an application storage volume in application storage volumes 540 associated with the application. Once identified, the operation retrieves the application from the identified application storage volume to satisfy the request. For example, end user 505 may desire to execute a first application on virtual machine 533, which also requires the execution of a version of shared file 551 or 552. In response to the request, operation 200 identifies the application that is associated with the request, and identifies the volume associated with the application. Accordingly, if the application resided on volume 541, shared file 551 will be retrieved for processing in machine 533. In contrast, if the application resided on volume 542, shared file 552 may be retrieved for processing by machine 533.

In some implementations, the user space of virtual machine 533 will indicate that only a single version of the shared file is available. For example, when the pointers to the files on the volumes are overlaid within the user viewable file system on virtual machine 533, a single pointer may appear for the shared file. However, when the file is required, by either an application on volume 541 or an application on volume 542, the appropriate version of the shared file may be retrieved from the volume based on the application associated with the request.

Referring back to the elements of FIG. 5, end user device 510 may include desktop computers, laptop computers, tablet computers, smartphones, or other similar end user devices, including combinations thereof. The end user device may include processing systems, data storage systems, communication interfaces to communicate with the virtual computing service, user interface elements to interface with the provided virtual desktop, or any other similar computing element. To communicate with virtual computing service 520 and the assigned virtual machine, the end user device may employ internet protocol (IP), Ethernet, optical networking, wireless protocols, communication signaling, or some other communication format—including combinations thereof.

Virtual computing service 520 may include communication interfaces, network interfaces, processing systems, computer systems, microprocessors, storage systems, storage media, or some other processing devices or software systems, and can be distributed among multiple devices. Virtual computing service 520 may comprise one or more server computers, desktop computers, or some other computing device capable of managing the connection between end user devices and virtual machines. Although illustrated as separate, it should be understood that virtual computing service 520 may execute on the same computing systems as virtual machines 530 and/or application storage volumes 540.

Virtual machines 530 execute via one or more host computing systems, and hypervisors that abstract the physical components of the host and provide the components to the virtual machine. These virtual components may include virtual processors, communication interfaces, and other virtualized components of the physical host system. Each of the host systems may include communication interfaces, network interfaces, processing systems, computer systems, microprocessors, storage systems, storage media, or some other processing devices or software systems. To communicate with virtual machines 530 and the corresponding host machines, virtual computing service 520 may employ internet protocol (IP), Ethernet, optical networking, wireless protocols, communication signaling, or some other communication format—including combinations thereof.

Application storage volumes 540 may be stored on solid-state media, hard disk media, or some other similar type of media, including combinations thereof. Volumes 541-543 may, in some implementations, comprise virtual disk drives, such as VMDKs or VHDs, although it should be understood that volumes 541-543 might be physical volumes in some examples. Although illustrated separate in the present example, it should be understood that application storage volumes 540 might be stored on the host computing systems with virtual machines 530. In other implementations, application storage volumes 540 may reside on separate computing hardware accessible by virtual machines 530 and the corresponding host systems. This separate computing hardware may include communication interfaces, network interfaces, processing systems, computer systems, microprocessors, storage systems, storage media, or some other processing devices or software systems. Host computing systems may communicate with the separate volume hardware using internet protocol (IP), Ethernet, optical networking, wireless protocols, communication signaling, or some other communication format—including combinations thereof.

Figure 6:
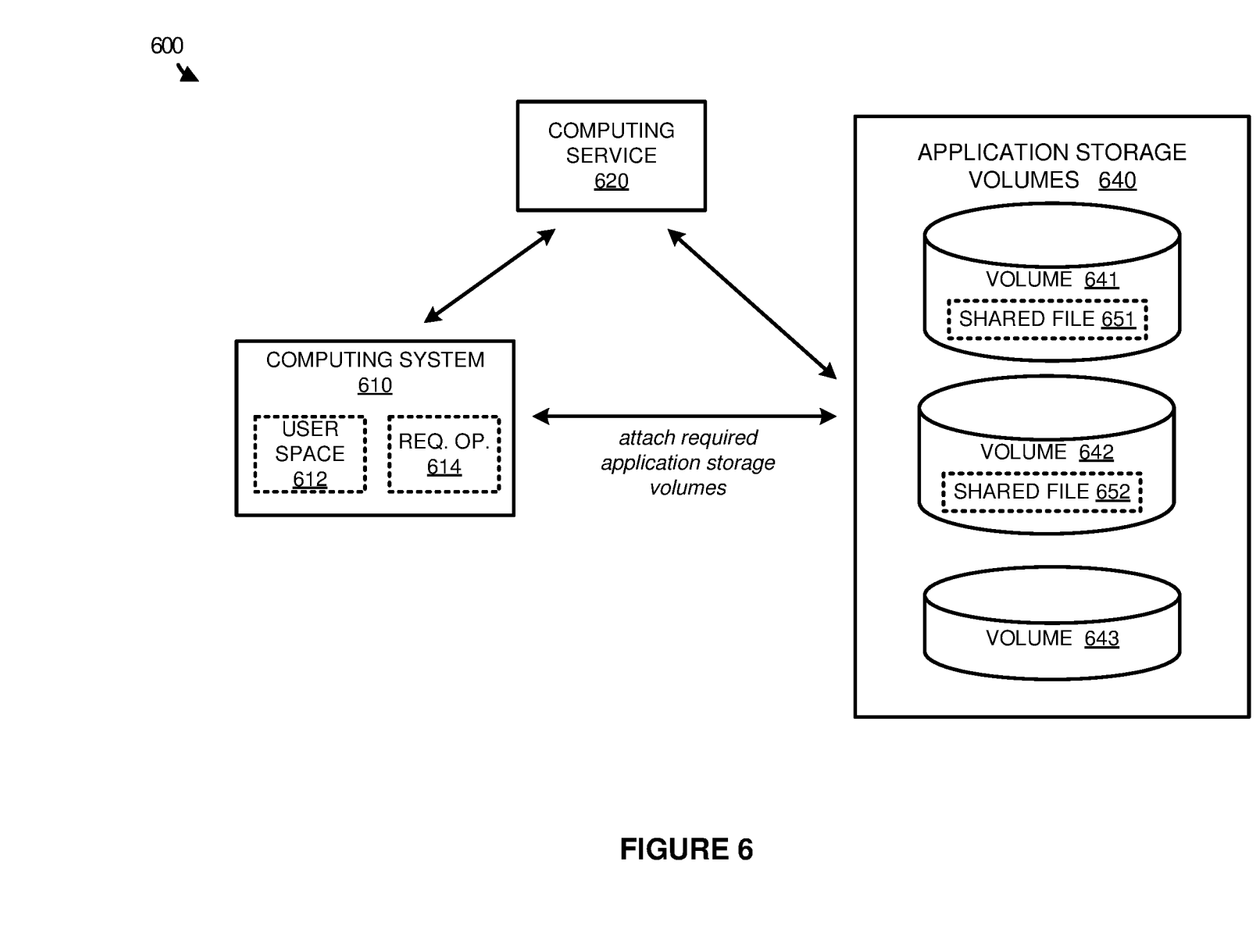
FIG. 6 illustrates a computing environment to manage conflicts in shared files for multiple applications according to one implementation.

FIG. 6 illustrates a computing environment 600 to manage conflicts in shared files for multiple applications according to one implementation. Computing environment 600 includes computing system 610, computing service 620, and application storage volumes 640. Computing system 610 further includes user space 612 and request operation 614, which operates as further described in operation 200 of FIG. 2. Application storage volumes 640 further includes volumes 641-643, wherein volumes 641-642 include different versions of a shared file 651-652.

In operation, computing system 610 may connect to computing service 620 to request the attachment of volumes associated with the user and/or the device itself. In response to the request, computing service 620 may identify volumes based on the identity (credentials) supplied for the user and/or the computing system and initiate an attach process to make one or more applications in application storage volumes 640 available for execution on computing system 610. In some implementations, the attachment process via computing service 620 may occur when computing system 610 begins execution (i.e. powered on, or taken out of sleep state). In other examples, the attachment process may begin when a user logs into computing system 610.

To attach the volumes to the computing system, the appropriate volumes may be mounted to the computing system by providing a file and/or network path to computing system 610 for the volumes, and the contents of the volumes may be overlaid within computing system 610, such that the contents look as though they have been locally installed within user space 612. For example, pointers to files for the application may be overlaid within the "C:\Program Files" directory of computing system 610 to make the application appear as though it has been locally installed. Further, registry files corresponding to the application may appear, using pointers, within the registry for computing system 610.

However, in some examples, such as that illustrated in computing environment 600, when application volumes are attached with different applications, each of the applications may require a specific version of a shared file. Specifically, if a first version of a shared file were required for a first application and a second version of a shared file were required for a second application, the first application may be incapable of operating with the second version of the shared file. Here, to overcome the issue of the shared file, the various versions of the shared file are stored by the application volume responsible for the corresponding application. Accordingly, referring to application storage volumes 640, the first application may be stored on volume 641 with the first version of the shared file 651, while the second application may be stored on volume 642 with the second version of the shared file 652.

However, although two different versions of the application file may be maintained for each of the applications, user space 612 may only be presented with a single version of the shared file when the application volumes are overlaid. Referring again to the example of a Microsoft Windows operating system, a shared file repository in the user file system view may only show that a single shared file is available, while two versions of the file may be used based on the application that is making the request for the shared file. Thus, request operation 614 is required to route requests for a particular shared file to the appropriate application storage volume. For example, when a request is initiated for a first application, request operation 614 may be used to identify the request, determine the application that was associated with the request, and identify that application storage volume that stores the files for the application. Once the volume is identified, the appropriate version of the file may be retrieved for processing.

Although illustrated in the examples of FIGS. 1-6 as a single real or virtual computing system communicating with a computing service to attach application storage volumes, it should be understood that any number of real or virtual machines may communicate with the service to attach storage volumes. In some implementations, the application storage volumes comprise read-only storage volumes capable of being attached to multiple computing systems. As a result, a single application (files, directories, etc.) may be installed on an application storage volume, and the volume may be attached to the computing systems with credentials to access the particular application.

Figure 7:
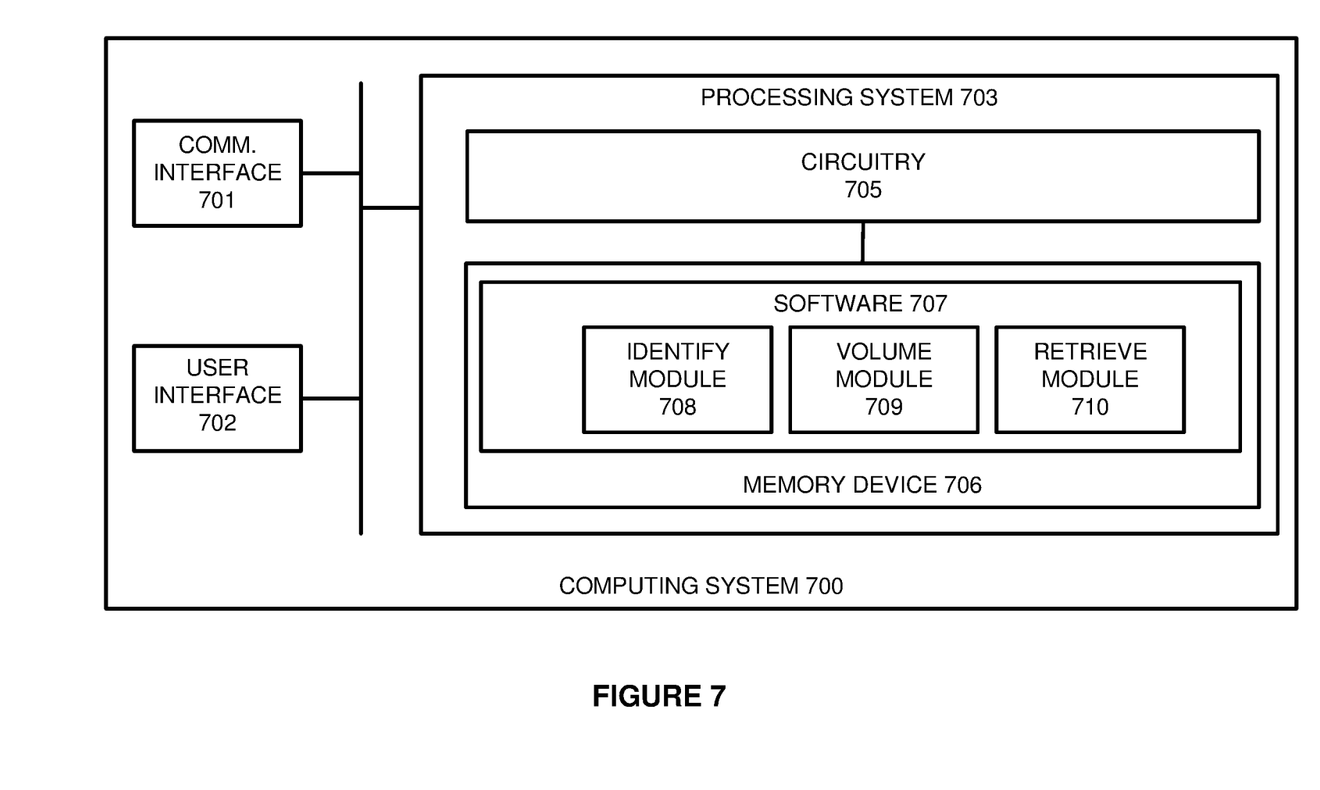
FIG. 7 illustrates a computing system to manage conflicts in shared files for multiple applications according to one implementation.

FIG. 7 illustrates a computing system 700 to manage conflicts in shared files for multiple applications according to one implementation. Computing system 700 is representative of any computing system or systems with which the various operational architectures, processes, scenarios, and sequences disclosed herein for managing shared file conflicts may be implemented. Computing system 700 is an example of computing system 110, and a computing apparatus for virtual machine 533, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity. Computing system 700 may comprise a server, a user device, a desktop computer, a laptop computer, a tablet computing device, or some other user communication apparatus.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In some implementations, communication interface 701 may be configured to communicate with application storage volumes that may be attached to computing system 701 to provide desired operations for an end user. In some examples, communication interface 701 may further be configured to communicate with a virtual computing service and/or an end user device to provide a virtual desktop to the end user device.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes identify module 708, volume module 709, and retrieve module 710, although any number of software modules within the application may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In at least one implementation, identify module 708, when read and executed by processing system 703, directs processing system 703 to identify a request for a shared application file, wherein the shared application file has one or more versions associated with various applications. For example, a plurality of application storage volumes may be attached to computing system 700 to provide applications to a user of computing system 700, wherein one or more of the applications may require a shared application file, such as a DLL file, or a registry key file that can be shared with other applications also attached to computing system 700. However, in the present example, the one or more applications may require a different version of the shared file to provide proper operation. For example, a first application on a first volume may require a first version of the shared file, while a second application on a second volume may require a second version of the shared file for operation.

To accommodate the requests for each of the applications, although a single shared file may be identifiable in the user space of computing system 700 (such as in the file system view or the registry file view), volume module 709 may direct processing system 703 to identify an application that is the source of the shared file request and identify a volume associated with the request. Once the volume is identified, retrieve module 710 may direct processing system 703 to retrieve the identified volume from the identified storage volume for processing.

As an illustrative example, based on credentials of a user of computing system 700, application storage volumes may be attached that provide specific applications to the user of computing system 700. To ensure that each of the applications does not prevent operation of another application that might be attached to the computing system, each of the applications may maintain their respective version of the shared file. Accordingly, when the volumes are mounted and the contents are overlaid within the computing system, only one shared file may be made visible within the user space, although each of the applications may use their respective version of the shared file. Thus, when a request is initiated, software 707 may be responsible for identifying the request and retrieving the appropriate version of the shared file from the attached storage volumes.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of handling requests for an application file on a computing system, wherein a plurality of versions of the application file are available on the computing system and each of the plurality of versions are stored on separate storage volumes attached to the computing system, the method comprising:
   presenting, in a file system view on the computing system, a first version of the application file as a representative for the plurality of versions of the application file;
   identifying a request for the first version of the application file on the computing system;
   identifying an application from a plurality of applications associated with the request;
   selecting a storage volume from the separate storage volumes based on the application, wherein each of the separate storage volumes stores a different application of the plurality of applications; and
   retrieving the version of the application file from the selected storage volume to support the request.

2. The method of claim 1 wherein the application file comprises a registry file or a dynamic link library (DLL) file.

3. The method of claim 1 wherein the computing system comprises a virtual computing system or a physical computing system.

4. The method of claim 1 wherein the separate storage volumes attached to the computing system are mounted to the computing system with registry information modified to make applications stored on the separate storage volumes executable from the separate storage volumes.

5. The method of claim 4 wherein files stored on the separate storage volumes are overlaid in at least the file system view for an end user of the computing system.

6. The method of claim 4 wherein files stored on the separate storage volumes are overlaid in at least the file system view and a registry view for an end user of the computing system.

7. The method of claim 1 further comprising:
   identifying a second request for the application file;
   identifying a second application associated with the second request;
   identifying a second separate storage volume in the separate storage volumes associated with the application; and
   retrieving the application file from the second separate storage volume to support the second request.

8. The method of claim 1 wherein the separate storage volumes are attached to the computing system based on credentials associated with an end user of the computing system.

9. A computing apparatus comprising:
one or more non-transitory computer readable storage media;
a processing system operatively coupled with the one or more computer readable storage media; and
program instructions stored on the one or more computer readable storage media to handle requests for an application file on a computing system, wherein a plurality of versions of the application file are available on the computing system and each of the plurality of versions are stored on separate storage volumes attached to the computing system that, when read and executed by the processing system, direct the processing system to at least:
present, in a file system view on the computing system, a first version of the application file as a representative for the plurality of versions of the application file;
identify a request for the first version of the application file on the computing system;
identify an application from a plurality of applications associated with the request;
select a storage volume from the separate storage volumes based on the application, wherein each of the separate storage volumes stores a different application of the plurality of applications; and
retrieve the version of the application file from the selected storage volume to support the request.

10. The computing apparatus of claim 9 wherein the application file comprises a registry file or a dynamic link library (DLL) file.

11. The computing apparatus of claim 9 wherein the computing system comprises a virtual computing system or a physical computing system.

12. The computing apparatus of claim 9 wherein the separate storage volumes attached to the computing system are mounted to the computing system with registry information modified to make applications stored on the separate storage volumes executable from the separate storage volumes.

13. The computing apparatus of claim 12 wherein files stored on the separate storage volumes are overlaid in at least the file system view for an end user of the computing system.

14. The computing apparatus of claim 12 wherein files stored on the separate storage volumes are overlaid in at least the file system view and a registry view for an end user of the computing system.

15. The computing apparatus of claim 9 wherein the program instructions further direct the processing system to:
identify a second request for the application file;
identify a second application associated with the second request;
identify a second separate storage volume in the separate storage volumes associated with the application; and
retrieve the application file from the second separate storage volume to support the second request.

16. The computing apparatus of claim 9 wherein the separate storage volumes are attached to the computing system based on credentials associated with an end user of the computing system.

17. An apparatus comprising
one or more non-transitory computer readable storage media; and
program instructions stored on the one or more computer readable storage media to handle requests for an application file on a computing system, wherein a plurality of versions of the application file are available on the computing system and each of the plurality of versions are stored on separate storage volumes attached to the computing system that, when read and executed by a processing system, direct the processing system to at least:
present, in a file system view on the computing system, a first version of the application file as a representative for the plurality of versions of the application file;
identify a request for the first version of the application file on the computing system;
identify an application from a plurality of applications associated with the request;
select a storage volume from the separate storage volumes based on the application, wherein each of the separate storage volumes stores a different application of the plurality of applications; and
retrieve the version of the application file from the selected storage volume to support the request.

18. The apparatus of claim 17 wherein the application file comprises a registry file or a dynamic link library (DLL) file.

19. The apparatus of claim 17 wherein the computing system comprises a virtual computing system or a physical computing system.

20. The apparatus of claim 17 wherein the separate storage volumes attached to the computing system are mounted to the computing system with registry information modified to make applications stored on the separate storage volumes executable from the application storage volumes, wherein files stored on the separate storage volumes are overlaid in at least the file system view for an end user of the computing system.

* * * * *